Jan. 1, 1935.  W. F. FOLMER  1,985,921
INSECT ELECTROCUTING DEVICE
Filed Dec. 4, 1933   3 Sheets-Sheet 3

INVENTOR
William F. Folmer
BY
his ATTORNEY

Patented Jan. 1, 1935

1,985,921

UNITED STATES PATENT OFFICE 1,985,921

INSECT ELECTROCUTING DEVICE

William F. Folmer, Rochester, N. Y., assignor to Folmer-Electracide Corporation, Rochester, N. Y., a corporation of New York Application December 4, 1933, Serial No. 700,771

5 Claims. (Cl. 43—112)

My present invention relates to insect exterminators of the general nature employing a cage-like baffle composed of alternated electrodes of opposite polarities suitably spaced to be short circuited by flying insect bodies that contact them, such baffles being customarily used with the provision of a suitable lure or lures on the inaccessible side thereof. It has for its broad object to provide a durable, weather-resisting and effective exterminator of this character that will be simple in construction and may be produced at relatively low cost. The improvements are directed in part toward the construction and assembly of the baffle unit and toward extending its intercepting effects in the paths of insect flight.

To these and other ends, the invention resides in certain improvements and combinations of parts, all as will be hereinafter more fully described, the novel features being pointed out in the claims at the end of this specification.

In the drawings:

Fig. 5 is a fragmentary, partly broken away, enlarged sectional detail of the terminal connections of the electrodes.

Similar reference numerals throughout the several views indicate the same parts.

This invention, in general, and with respect to the particular embodiment illustrated, constitutes an improvement applicable to the invention of the prior application for Letters Patent of myself and another, filed May 9, 1933, Serial No. 670,142. This being the case, and the disclosure there being largely repeated here, the present description will make reference only briefly to the major elements of the old combination, such details as arrangement and circuit connections being omitted.

Figure 3:
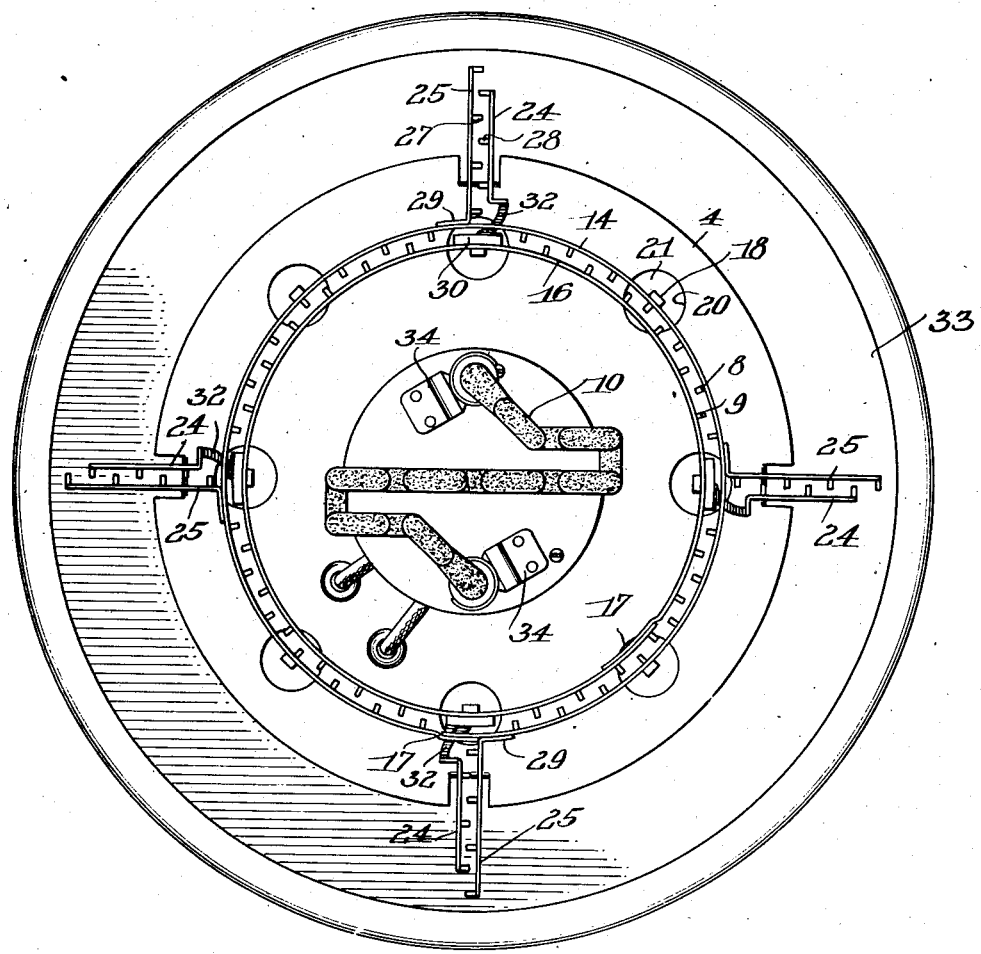
Fig. 3 is a bottom plan view.

Referring more particularly to the drawings, 1 indicates a dome or housing adapted to be suspended in a locality infested by the insects by an eye 2 at the top thereof, through which also is introduced a suitable connection 3 from the line wire or prime source of electrical energy. The base of the dome carries a flooring or stage 4, shown in plan in Fig. 3, which is supported by lugs 5 and screws 6 and erected on this stage within the protection of the dome is a transformer unit, indicated generally at 7, for stepping up the line voltage to the required high tension of 3,000 volts or more. Depending from the stage is the cylindrical barrier or cage composed of the alternating positive and negative electrode wires 8 and 9 housing the lure lamp 10.

The cage or barrier I form of sheet metal stampings. Two strips are of suitable gauge and stamped with rows of elongated perforations 12 sufficiently spaced to produce the wires 8 and 9 of a cross section supplying adequate mechanical strength and electrical capacity. The remainder of the strips at the upper and lower margins emerge as rings 13 and 14 on what we will designate as the positive group of electrode wires 8, and 15 and 16 on the negative group. The sheets or strips are then rolled into cylinders and the overlapping ends of the rings riveted or similarly secured together, as indicated at 17. The negative cylinder 15—16 is smaller than the other to be encompassed thereby in radially spaced relationship so that rings are air insulated from each other. The respective wire electrodes 8 and 9 alternate with each other so that those of one group come opposite the centers of the openings 12 of the other group. Either before or after the cylinder is formed, each group of wires may be directionally oppositely offset, as by a forming die, so that each such set of wires actually occupies the openings of the other set, as appears from a comparison of Figs. 2 and 4. This brings all of the wires of both groups into the same circumference or cylindrical plane with the positive and negative electrodes spaced just sufficiently to prevent arcing and yet close enough together so that their electrified zones will prevent the passage of even tiny insect bodies without inducing the arc. The resulting arrangement has all the advantages and possibilities of a wire construction, yet it is stiffer, stronger and much easier and cheaper to manufacture with enduring exactitude.

Figure 2:
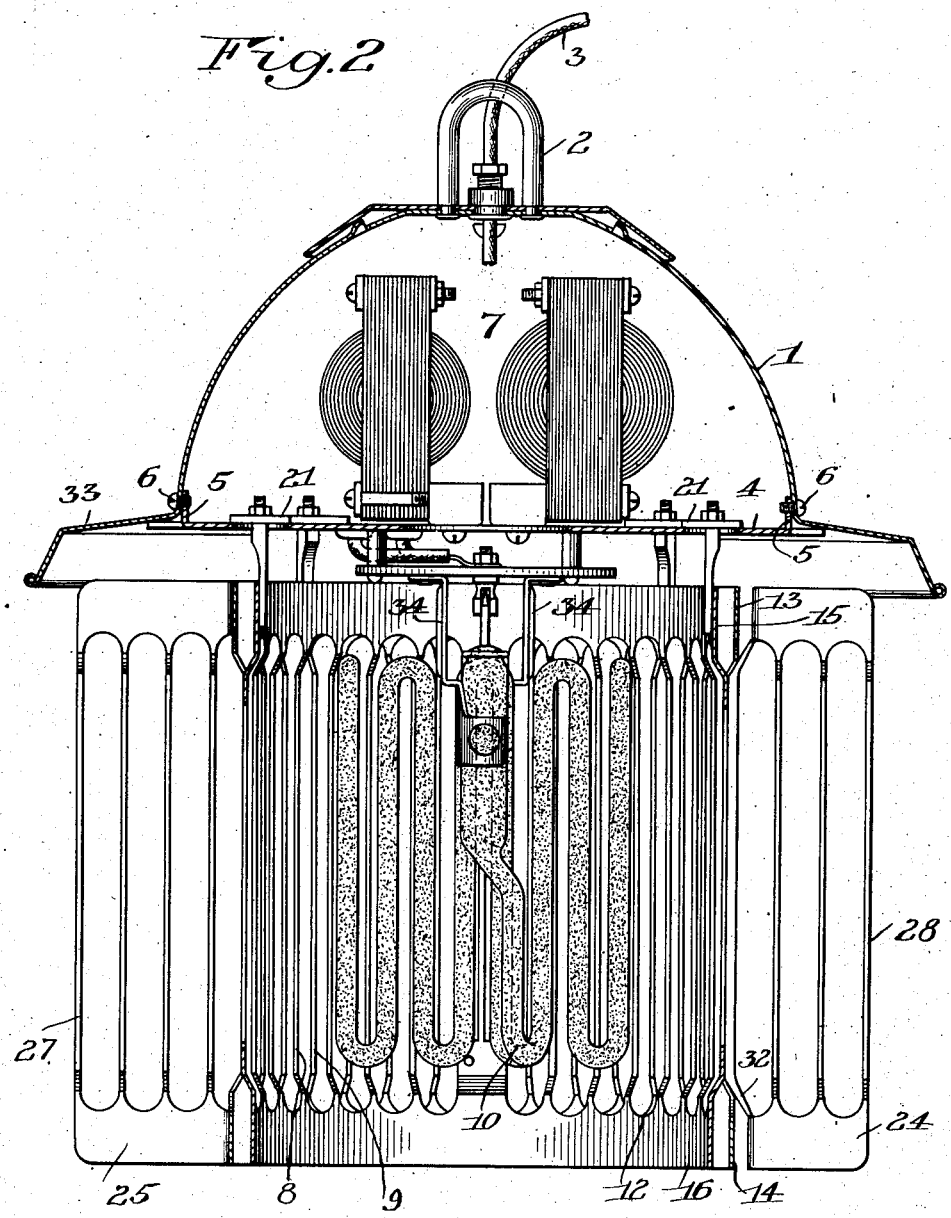
Fig. 2 is a central vertical section therethrough.

The cage is hung from the stage 4 by insulated connections extending from the latter, respectively, to the inner and outer spaced top rings 13 and 15 of the respective electrode elements in the manner best shown in Figs. 2 and 5. The lower ends of binding posts 18 are riveted thereto at 19 and extend through wide openings 20 in the stage 4 and through individual insulating blocks 21 bridging the openings and riveted to the stage. Of course, only two of these have to be connected to the wires 23 of the transformer 7, as shown, the others acting merely as supporting bolts.

It is a fact of common observation that moths and other night flying insects in their erratic flight about a lamp take a generally circular course of narrowing diameter until they finally reach the light center, though there seems to be so little preconception about their intention that they will often veer off into the shadows and disappear for no apparent reason at all. There is a theory among entomologists that their reactions to light are sub-conscious or purely mechanical in that the light affects their nerves and muscles automatically rather than breeding in them a desire to reach the light through ocular perception.

Figure 1:
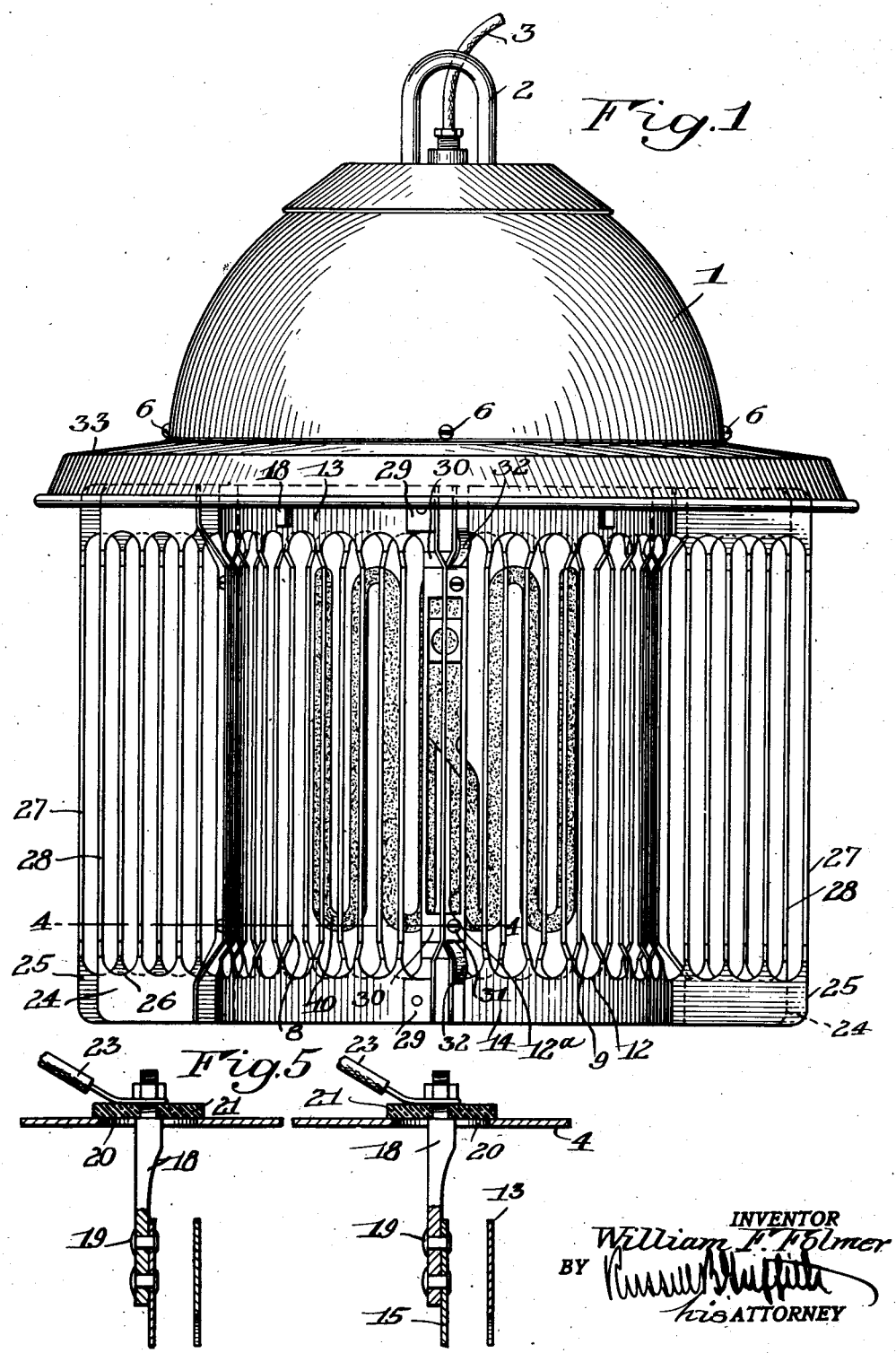
Fig. 1 is a side elevation of an insect exterminating cage constructed in accordance with and illustrating one embodiment of my invention.
Figure 4:
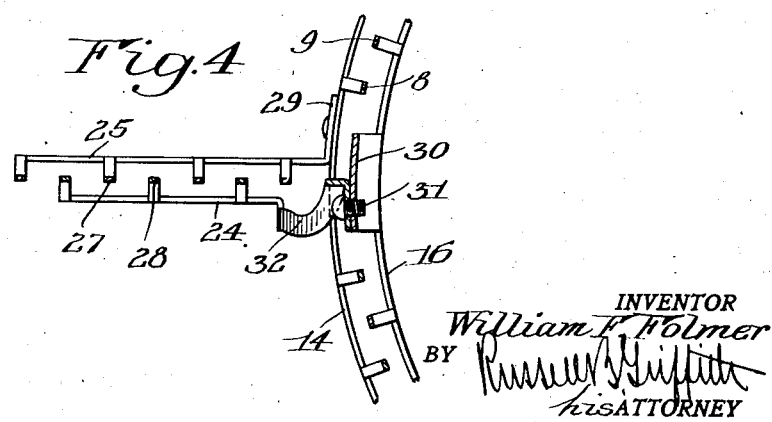
Fig. 4 is an enlarged fragmentary section through one of the vane-supporting connections taken substantially on the line 4—4 of Fig. 1, looking in the direction of the arrows.

However this may be, I provide the exterminator with means which extends the scope of its effectiveness to intercept revolving insect bodies that might otherwise escape and, in the practice of my invention, as herein embodied, this means consists of a plurality of substantially radially arranged vanes that project from the body of the cage and the lure center. Each comprises a pair of plates 24 and 25 having openings 26 corresponding to the openings 12 and similarly formed positive and negative electrodes 27 and 28. The plate 25 has lugs 29 at top and bottom, by means of which it is riveted or otherwise secured to the outer rings 13 and 14 of the cage. One pair of negative electrodes on the inner rings 15 and 16 are separated by a shorter opening 12ª providing extensions 30 at top and bottom on the ring, while the corresponding positive electrodes 8 on the outer rings are more widely separated at this point or, in fact, one or more of them is omitted to provide a space among these outer positive electrodes. Thus, inwardly projecting extension brackets at the top and bottom of plate 24 are secured at 31 to the extensions 30, as best shown in Figs. 1 and 4, such brackets being indicated at 32, and plate 24 is thus supported from the inner rings and projects in proper spaced relationship through the outer electrodes of the other group in proper relationship to plate 25.

The dome 1 is provided with an extension roof or water shed 33 to cover the vanes.

It has been found as a result of actual tests that these vanes, though of less aggregate area, intercept and kill as many insects as does the body cage while they add little to the weight of the device and also little to the cost of construction.

I have illustrated, in the present instance, the lure 10 as consisting of a plurality of vertical loops of a mercury vapor tube lamp having a push socket connection 34 with the stage 4.

I claim as my invention:

1. In an insect electrocuting device of the character described, the combination with a cage adapted to contain a lure and comprising a continuous series of spaced electrodes in successive pairs, the units of which are relatively insulated and of opposite polarity, of vanes also each comprising a similar series of electrodes and projecting outwardly substantially radially from the cage.

2. In an insect electrocuting device of the character described, the combination with a cylindrical cage adapted to contain a lure and comprising a continuous series of spaced electrodes in successive pairs, the units of which are relatively insulated and of opposite polarity, of vanes also each comprising a similar series of electrodes and projecting outwardly radially at intervals from the cylinder of the cage, all of the electrodes of the same polarity on each vane being mounted upon and electrically connected to an electrode of that polarity in the cage series.

3. In an insect electrocuting device of the character described, the combination with a cage adapted to contain a lure and comprising a continuous series of spaced electrodes in successive pairs, the units of which are relatively insulated and of opposite polarity, one of said electrodes being wider than the others, of vanes also each comprising a similar series of electrodes and projecting outwardly radially at intervals from the cylinder of the cage, all that group of electrodes of the same polarity being mounted upon and electrically connected to an electrode of that polarity in the cage series, one such group being secured to the beforementioned wider electrode of the cage.

4. In an insect electrocuting device of the character described, the combination with an insulated support, of a pair of concentric, relatively spaced cylinders of sheet metal hung therefrom and each having a series of long parallel openings therein at spaced intervals to provide intervening spaced electrodes, the inner cylinder being provided with a relatively wider such electrode opposite a relatively wider space between electrodes in the outer cylinder, a radially extending vane comprising two spaced sheet metal plates having similarly formed electrodes, one of which plates is mounted on the wide electrode of the inner cylinder and the other of which is connected to the annular end portion of the outer cylinder, and high tension positive and negative electrical supply connections for the respective cylinders.

5. The combination with a support and an insect lure thereon, of electrified high potential vanes extending substantially radially about said lure and each comprising a plurality of alternated positive and negative electrodes.

WILLIAM F. FOLMER.